United States Patent [19]

Dillenbeck et al.

[11] Patent Number: 5,232,497
[45] Date of Patent: Aug. 3, 1993

[54] CLAY CONTROL ADDITIVE FOR CEMENT COMPOSITIONS AND METHOD OF CEMENTING

[75] Inventors: Robert L. Dillenbeck, Oklahoma City, Okla.; Scott G. Nelson, Hobbs, N. Mex.; Bobby E. Hall, Houston; Dean S. Porter, Robstown, both of Tex.

[73] Assignee: The Western Company of North America, Houston, Tex.

[21] Appl. No.: 876,439

[22] Filed: Apr. 30, 1992

[51] Int. Cl.$^5$ .............................. C04B 24/12
[52] U.S. Cl. .................. 106/727; 106/734; 106/808; 106/823; 166/293; 166/294
[58] Field of Search .............. 106/727, 734, 808, 823; 166/293, 294

[56] References Cited

U.S. PATENT DOCUMENTS

| | | | |
|---|---|---|---|
| 3,931,096 | 1/1976 | Guilbault et al. | 166/293 |
| 4,393,939 | 7/1983 | Smith et al. | 106/718 |
| 4,626,285 | 12/1986 | Peiffer et al. | 106/803 |
| 4,674,574 | 6/1987 | Savoly et al. | 106/719 |
| 4,700,780 | 3/1987 | Brothers | 166/293 |
| 5,016,711 | 5/1991 | Cowan | 106/727 |
| 5,097,904 | 3/1992 | Himes | 166/294 |
| 5,099,923 | 3/1992 | Aften et al. | 166/294 |

*Primary Examiner*—Mark L. Bell
*Assistant Examiner*—Anthony J. Green
*Attorney, Agent, or Firm*—Peter A. Bielinski

[57] ABSTRACT

A clay control additive for cement composition of the general formula:

$$R-\underset{\underset{R}{|}}{\overset{\overset{R}{|}}{N^+}}-RX$$

wherein the R groups are selected from a $C_1$ to $C_4$ substituted alkyl.

17 Claims, No Drawings

5,232,497

CLAY CONTROL ADDITIVE FOR CEMENT COMPOSITIONS AND METHOD OF CEMENTING

FIELD OF THE INVENTION

The present invention relates generally to oil well cementing compositions and methods for their use and more specifically to clay control additives for such compositions.

BACKGROUND OF THE INVENTION

In well completion operations, a casing or liner is suspended in the borehole, and cement is pumped down the casing. The cement flows back up the annulus between the outside of the casing and the wall of the borehole. In a remedial/squeeze operation, the cement slurry is pumped under pressure through holes or perforation into annular or zonal voids. One problem encountered in these operations is that filtrate from the cement can cause damage to the adjacent formation.

If the well has zones which contain clays or shales which are sensitive to fresh water, or more specifically to cement filtrate, these zones could be damaged during the cementing operation.

There are two main families of materials used to prevent damage to clay or shale zones; clay stabilizers and clay controllers. Clay stabilizers are usually organic barrier type materials which adsorb onto the clays and are consumed. In this way they prohibit swelling and/or migration and are generally considered to be permanent. These materials are usually very effective and are often used in stimulation treatments. Because they are consumed, care must be exercised to utilize sufficient volumes throughout an application. Due to the relative high cost of these materials, they are not capable of treating deep clays or shales and are not widely used in cement operations. Most cement methods use clay controlling agents such as salt (NaCl) and KCl. Clay controllers are effective only as long as the solutions containing the material are in contact with the clays. These materials are generally less expensive than permanent clay stabilizers and since they are not normally adsorbed, they are not consumed. The quaternary amine complex materials disclosed here are considered to be clay control materials.

In addition to the possibility of damaging formation permeability with cement filtrate, there is another area where untreated cement filtrate can cause significant problems. If the water in the cement slurry destabilizes sensitive sections of a hole, for example in shales, extreme cases can result in a complete failure of the primary cement placement. In these cases, remedial cementing must be performed. Many times, even if the remedial cementing is considered a success, it still does not deliver the zonal isolation and casing protection possible in a successful primary cement operation.

Given the serious implications, concerned operators and service companies have tried for years to combat both situations with varying degrees of success. Following the example of mud companies, various loadings of salt (sodium chloride) are often used in cement formulations to protect against shale and clay problems. The concentrations of salt can be between 5% and 37.2% (salt saturated) by weight of mix water (BWOW) and the effects on cement performance differ depending on the concentration used. Concentrations of less than 10% tend to accelerate set times, concentrations between 10% and 18% have little effect, and concentrations greater than 18% retard set times. In addition, lower concentrations of salt may act to disperse or thin cement slurries, while salt saturation can cause an increase in slurry viscosity and associated mixing difficulties. Fluid loss control agents can also be severely degraded by higher salt concentrations, often necessitating higher loadings of the control agent to maintain the desired level of fluid loss. High salt concentrations can also contribute to excessive air entrainment during mixing requiring chemical defoamers. While most of these side effects can usually be compensated for with careful testing and addition of other additives, this can be a demanding and expensive solution to clay control. Since the effect of salt depends directly on its concentration, unintentional variations in concentration, caused by loading errors, poor blending, or deblending during transit, can result in a cement system that does not perform well in the field.

In an effort to avoid the inherent problems associated with adding salt to cements, some operators turn to potassium chloride (KCl) to prevent clay problems. In many clays, the superiority of the potassium ion over sodium in terms of stabilization allows for much lower concentrations of KCl to give equal or even better results than higher loadings of salt. KCl loadings are usually between 2% and 5% BWOW. Loadings of KCl higher than 8% BWOW tend to cause extreme slurry gelation problems and are therefore not commonly used. The lower loadings of KCl are often more economical than salt and since the range of concentrations used is so much smaller, the variations in side effect across that range is very limited. Although the effects tend to vary in magnitude with curing temperature, like salt, low concentrations of KCl can act as an accelerator of cement set times and compressive strength development. In most slurries, KCl tends to be a more effective accelerator than an equal amount of NaCl. KCl also has been found to degrade the performance of at least some fluid loss control additives even more than an equivalent amount of salt. Unlike salt, it has been shown that even at the relatively low concentration of 5%, KCl can increase slurry viscosity. As with salt, additional additives such as fluid loss control, retarders, dispersants, etc. and testing are usually necessary to successfully utilize KCl as a cement clay control.

In using either salt or KCl, there are occasional situations where necessary slurry parameters have to be compromised or even sacrificed due to difficulties in overcoming certain adverse effects of these two materials. Additionally, it has been found that the apparent low cost of salt or KCl as cement clay control additives can be multiplied many times over when the cost of necessary remedial materials is considered.

SUMMARY OF THE INVENTION

This invention relates to a cementing composition with enhanced clay control properties for use in wells and a method of using such cementing composition. In one embodiment of the present invention a cementing composition is provided comprising water, hydraulic cement, a fluid loss additive and clay control additive comprising a quaternary amine complex.

In another embodiment of the present invention there is provided a method of cementing a casing in a borehole penetrating a subterranean formation comprising: introducing a cementing composition into the annulus between said conduit and said formation, said cementing composition containing a fluid loss additive and a clay control additive comprising a quaternary amine complex and allowing said cementing composition to set within said space.

In another embodiment of the present invention there is provided a method of cementing a conduit in a borehole penetrating a subterranean formation by introducing a cementing composition into the annulus between said conduit and said formation, said cementing composition comprising cement, an aqueous fluid, a fluid loss additive and a clay control additive comprising a quaternary amine complex.

DETAILED DESCRIPTION

The composition of the present invention is comprised of an aqueous fluid, hydraulic cement and a clay control additive comprising a quaternary amine complex.

More particular descriptions of the invention are set forth below with respect to typical embodiments thereof, but the described embodiments should not be considered limiting of its scope, for the invention may admit to other equally effective embodiments which may be apparent from the description to one of ordinary skill in the art.

The clay control additive of the present invention is of the general formula:

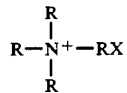

The R groups are independently selected from $C_1$ to $C_4$ substituted alkyl. Preferably at least one R is selected from $C_1$ to $C_4$ halogen substituted alkyls. Suitable examples of $C_1$ to $C_4$ alklyls are $-CH_3$, $-C_2H_5$, $-C_3H_7$ and $-C_4H_9$. The substituted alkyls may be mono-, di- or trisubstituted. Preferred substituents include chloride, bromide, fluoride, iodide, nitrate, nitrite, hydroxyl and sulfate. Preferably, the substituted alkyl is 2-bromoethyl, 2-hydroxylethyl or 2-chloroethyl. Preferably, the clay control additive is (2-chloroethyl) trimethylammonium chloride, (2-bromoethyl) trimethylammonium chloride, (2-hydroxylethyl) trimethylammonium chloride, tetramethylammonium chloride or trimethylethylammonium chloride. Most preferably, the clay control additive is (2-chloroethyl) trimethylammonium chloride.

Generally, X is a halide anion, or any other ion which is compatible with the subterranean formation to be treated, and the constituents of the treating fluid. Preferably, X is selected from the group consisting of chloride, bromide, fluoride, iodide, nitrate, nitrite, hydroxyl and sulfate. Preferably X a halide, most preferably chloride.

The clay control additives of the present invention can be present in the cement composition at concentration in the range of about 0.01% to about 5.0% BWOW preferably 0.05%, 2.0% BWOW and most preferably 0.1% to 1.0% BWOW.

The term "cement" as used herein is intended to include those compounds of a cementitious nature which are described as hydraulic cements. Such compounds include, for example, Portland Cement in general and particularly Portland Cements of API Classes G and H, although other API classes can be utilized, pozzolan cements, gypsum cements, high alumina content cements, high gel (high clay content) cements, silicate containing cements and high alkalinity cements can be used in various applications of the present invention. Portland cements and particularly cements of API Classes G and H are preferred.

The aqueous fluid utilized in the cement composition can be water from any source provided that it does not contain an excess of any compounds that affect the stability of the cement composition of the present invention. Depending upon the particular cement slurry being formed and the intended conditions of use, the aqueous fluid is utilized in the cementing composition in an amount of from about 150 to about 30 percent by weight of dry cement. Preferably, the aqueous fluid is present in an amount in the range of from about 50 to about 35 percent by weight of dry cement.

Fluid-loss additives which may be incorporated into the cement composition of the present invention include cellulose derivatives such as carboxymethylhydroxyethyl cellulose, hydroxyethyl cellulose, modified polysaccharides, polyacrylamides polyaromatic sulfonates, guar gum derivatives, mixtures of such compounds and the like. Numerous other compounds which may be utilized as fluid loss additives are well known by those skilled in cementing technology.

Other types of well known and conventional additives may be incorporated into the cement composition, such as viscosifiers, retarders, accelerators, dispersants, weight-adjusting materials or fillers and the like. These additives may include, for example, (1) heavy weight additives, such as hematite, ilmenite, silica flour and sand; (2) cement retarders such as lignins and lignosulfonates; and (3) additives for controlling lost circulation such as walnut hulls and cellophane flakes.

The quaternary amine complex clay control additives according to the present invention meet or exceed the level of clay control achieved by the currently used materials without any significant effect on the base cement slurry. Permeability damage to clays in the formation is effectively reduced and hole instability occuring during placement of the cement is also reduced. No additional fluid loss control, free water control, retarders or dispersant are necessary in most applications.

Cement compositions containing the present clay control additives display improved pumpability. This feature, in turn, enhances drilling fluid removal and decreases lost circulation when cementing a conduit.

In addition, since the present additive is a liquid and is added to the mix water or directly into the slurry it cannot segregate out of the slurry during transportation or be unevenly mixed as is the case with the KCl or salt systems. Also, if the concentration of the quaternary amine additives of the present invention are allowed to fluctuate in the cement system the critical placement parameters will not be affected.

In situations where the treated slurries are circulated to surface, or come into contact with fresh water zones, the systems can create environmental liabilities due to the possibility of chlorides leaching into runoff and/or ground water. The possible environmental impact of cement compositions according to the present invention is decreased since they have about one-tenth the amount of chlorine compositions containing salt or KCl would have. The clay control additives of the present invention achieves all of these advantages and do so while maintaining an economic advantage as well.

EXAMPLES

The following tests were performed to examine the utility of the present invention as a clay control additive. All concentrations are given as percent by weight.

Cement slurries were prepared using Class H Le-Harve Cement, 38% distilled mixing water, and 0.5% of a fluid loss additive available from The Western Company of North America. The quaternary amine was (2-chloroethyl) trimethylammonium chloride. Thickening time tests were run using API liner and casing cementing well-stimulation test schedules according to API Specification 10, Appendix E. Fluid loss tests were run according to API Specification 10, Appendix F. Compressive strength tests were destructive crush tests run according to API Specification 10, Schedule 4Sg.

Table I shows the clay control properties of the (2-chloroethyl trimethylammonium chloride at 0.25%. Column flow tests were performed using a 1 inch column 15 inches long. The column contained 45 grams of Oklahoma No. 1 sand, 4 grams silica flour and 1 gram sodium bentonite. The columns were hydrated with 5% NaCl and pressurized at 7 psi. The results with the 0.25% quaternary amine system were compared to the results with the 2% KCl system. The filtrate samples for testing in the column were separated from actual cement slurries using a conventional high temperature, high pressure fluid loss cell. The cement slurries cotained 0.6% of a high molecular weight polymer blend fluid loss additive available from The Western Company of North America as CF-18 TM and either KCl or the quaternary amine. The control was filtrate containing neither KCl or quaternary amine complex. The quaternary amine was (2-chloroethyl) trimethylammonium chloride.

The cells' original flow rate was first recorded with 5% BWOW salt water. After recording the initial flow rate, a 100 cm$^3$ sample of the subject filtrate was then flowed through the cell with rates and times recorded. This filtrate was followed with 5% BWOW salt water and the flow rate was recorded so that the retained percentage of original flow could be calculated. To verify that both KCl and quaternary amine are in fact control agents, and not permanent stabilizers, a final pass through the cell was run with de-ionized water, with rates and times recorded.

TABLE I
COLUMN FLOW TEST

| | | SYSTEM | |
|---|---|---|---|
| | Control | Control + 0.25% Quaternary Amine | Control + 2.0% KCl |
| 1. % original flow with filtrate | 57.8 | 43.0 | 29.6 |
| 2. Time to collect 30 ml (min) | 1.9 | 3.53 | 4.15 |
| 3. Time to collect 100 ml (min) | 9.05 | 14.0 | 116.0 |
| 4. % original flow with 5% salt water | 65.4 | 67.6 | 43.0 |
| 5. % original flow with de-ionized water | 35.2 | 32.4 | 39.8 |

Table I shows that the quaternary amine performs better than 2% KCl even at a concentration of 0.25%. The first line shows that the flow rate with the quaternary amine was 43% of the original rate compared with 29.6% for the KCl containing sample.

Lines 2 and 3 show again that flows were significantly better for the quaternary amine sample. Line 4 shows higher retained flow rate for the quaternary amine and line 5 confirms that the quaternary amine is a clay control additive and not a permanent clay stabilizer since the column rehydrates with fresh water.

TABLE II
EFFECT ON CEMENT SLURRY PROPERTIES

| | | SYSTEM | | |
|---|---|---|---|---|
| | Control | Control + 0.2% Quaternary Amine | Control + 2.0% KCl | Control + 5.0% NaCl |
| 6. Weight lbs/gal. | 16.4 | 16.4 | 16.4 | 16.4 |
| 7. Yield ft$^3$/sack (94 lbs) lbs | 1.06 | 1.06 | 1.07 | 1.08 |
| 8. Thickening time (casing) min$^a$ | 195 | 195 | 165 | 155 |
| 9. Thickening time (squeeze) min$^b$ | 125 | 115 | 90 | 80 |
| 10. Fluid loss$^c$ ml | 137 | 135 | 234 | 366 |
| 11. 24-hr compressive strength psi$^d$ | 4230 | 4170 | 4690 | 4120 |
| 12. 7-day compressive strength psi$^d$ | 5980 | 5930 | 5620 | 4890 |
| 13. Chloride concentration in filtrate ppm | 1000 | 1400 | 11200 | 29400 |

$^a$API SPECIFICATION 10A Casing Cementing Schedule 50 (8000 ft, 128° F. BHCT)
$^b$API SPECIFICATION 10A Squeeze Cementing Schedule 17 (10,000 ft, 140° F. BHCT)
$^c$API SPECIFICATION 10 (30 minute fluid losses at 128° F. BHCT)
$^d$API SPECIFICATION 10 Schedule 4Sg (1000 psi casing pressure at 175° F. BHCT)

Table II lists the properties of the cement slurries. The control was a cement slurry containing 0.5% of a high molecular weight polymer blend fluid loss additive available from The Western Company of North America as CF-14 TM. Lines 8 and 9 show very little acceleration of set times for a casing or squeeze schedule respectively. Line 10 shows no increase in fluid loss while both KCl and NaCl systems show a dramatic increase. Lines 11 and 12 show that although the one day strength for the quaternary amine system is slightly lower, 7 day strengths are significantly higher than the KCl or NaCl systems. Line 13 shows the results of total chlorides on clear filtrate from each slurry. The chloride content of the quaternary amine system filtrate is significantly lower than the KCl or NaCl systems.

TABLE III
FREE WATER

| SYSTEM | FREE WATER |
|---|---|
| Control | 0.2 ml |
| Control + 0.2% quaternary amine | 0.2 ml |
| Control + 2.0% KCl | 2.0 ml |
| Control + 5.0% NaCl | 1.2 ml |

Table III shows the free water test results. There is no increase in free water for the quaternary amine system while the KCl and NaCl systems show dramatic increases. The control was cement slurry containing 0.1% of a lignosulfate retarder available from The Western Company of North America as WR-15 TM. The tests were conducted according to API Specification 10A (128° F. BHCT).

TABLE IV

| | Control | Control + 0.2% Quaternary System | KCl System | Salt System |
|---|---|---|---|---|
| 600 | 114 | 114 | 114 | 106 |
| 300 | 55 | 55 | 55 | 49 |
| 200 | 35 | 35 | 35 | 33 |
| 100 | 17 | 17 | 17 | 17 |
| 6 | 1 | 1 | 1 | 2 |
| 3 | 1 | 1 | 1 | 1 |

RHEOLOGIES READINGS

Table IV shows rheologies are not affected by the quaternary amine. The controls were those used in Table III. The tests were conducted under API Specification 10 (128° F. BHCT).

TABLE V

CLAY CONTROL COSTS
CLAY CONTROL MATERIAL COSTS

| CLAY CONTROL AGENT | PER 94 LBS OF CEMENT |
|---|---|
| 1. 0.2% Quaternary Amine | $0.186 |
| 2. 2.0% KCl | $0.180 |
| 3. 5.0% Salt | $0.202 |

TABLE VI

CLAY CONTROL COSTS
TOTAL CLAY CONTROL COSTS

| CLAY CONTROL AGENT | PER 94 LBS OF CEMENT |
|---|---|
| 4. 0.2% Quaternary Amine | $0.186 |
| 5. 2.0% KCl<br>+ 0.3% additional fluid loss<br>+ 0.15% additional retarder | $2.140 |
| 6. 5.0% Salt<br>+ 0.4% additional fluid loss<br>+ 0.2% additional retarder | $2.815 |

Table V shows that the costs of the systems being examined are competitive. The costs reflect the direct costs of the clay control chemical only. Table VI shows the total cost of clay control materials and corrective materials. Lines 5 and 6 show the total costs of clay control additive plus any additional fluid loss additive or retarder necessary to overcome the effects of the KCl or salt. Since corrective materials must usually be added to the KCl and NaCl systems, the relative cost of the quaternary amine system of the present invention is significantly less.

The principle of this invention and the best mode contemplated for applying that principle have been disclosed. It is understood that the foregoing is for illustrative purposes only and that other means and techniques may be used without departing from the true scope of this inventive concept.

What is claimed is:

1. A cementing composition comprising: an aqueous fluid, hydraulic cement, a fluid loss additive and a clay control additive of the general formula:

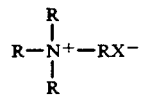

wherein each R is independently a $C_1$ to $C_4$ substituted alkyl and wherein the substituent is selected from the group consisting of chloride, fluoride, bromide, iodide, nitrate, nitrite, hydroxide and sulfate and X is an anion which is compatible with the formation being treated.

2. The composition of claim 1, wherein the clay control additive is present in the cementing composition in the range of about 0.01 to about 5.0 percent by weight of aqueous fluid.

3. The composition of claim 1 wherein the clay control additive is present in the range of about 0.05 to about 2.0 percent by weight of aqueous fluid.

4. The composition of claim 1 wherein the clay control additive is present in the range of about 0.1 to about 1.0 percent by weight of aqueous fluid.

5. The composition of claim 1, wherein said clay control additive is present in said cementing composition in an effective amount whereby permeability damage resulting from contact of the clays in the formation with the aqueous portion of the cementing composition is reduced.

6. The composition of claim 1, wherein the clay control additive comprises at least one of (2-chloroethyl) trimethylammonium chloride, (2-bromoethyl) trimethylammonium chloride, (2-hydroxyethyl) trimethylammonium chloride, tetramethylammonium chloride or trimethylethylammonium chloride.

7. A method of cementing a casing in a borehole penetrating a subterranean formation comprising:
introducing a cementing composition into the annulus between said conduit and said formation, said cementing composition containing a clay control additive of the general formula:

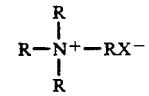

wherein each R is independently a $C_1$ to $C_4$ substituted alkyl and wherein the substituent is selected from the group consisting of chloride, fluoride, bromide, iodide, nitrate, nitrite, hydroxide and sulfate and X is an anion which is compatible with the formation being treated; said clay control additive being present in said cementing composition in an effective amount whereby permeability damage resulting from contact of the clays in the formation with the aqueous portion of the cementing composition is reduced; and
allowing said cementing composition to set within said space.

8. The method of claim 7, wherein the clay control additive is present in the cementing composition in the range of about 0.01 to about 5.0 percent by weight of aqueous fluid.

9. The method of claim 7, wherein the clay control additive is present in the range of about 0.05 to about 2.0 percent by weight of aqueous fluid.

10. The method of claim 7, wherein the clay control additive is present in the range of about 0.1 to about 1.0 percent by weight of aqueous fluid.

11. The method of claim 7, wherein the clay control additive comprises at least one of (2-chloroethyl)trimethylammonium chloride, (2-bromoethyl)trimethylammonium chloride, (2-hydroxyethyl)trimethylammonium chloride, tetramethylammonium chloride or trimethylethylammonium chloride.

12. A method of cementing a conduit in a borehole penetrating a subterranean formation by introducing a cementing composition into the annulus between said conduit and said formation, said cementing composition comprising: cement, an aqueous fluid, a fluid loss additive and a clay control additive of the general formula

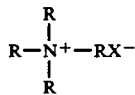

wherein each R is independently a $C_1$ to $C_4$ substituted alkyl and wherein the substituent is selected from the group consisting of chloride, fluoride, bromide, iodide, nitrate, nitrite, hydroxide and sulfate and X is anion which is compatible with the formation being treated.

13. The method of claim 12, wherein the clay control additive is present in the cementing composition in the range of about 0.01 to about 5.0 percent by weight of aqueous fluid.

14. The method of claim 12, wherein the clay control additive is present in the range of about 0.05 to about 2.0 percent by weight of aqueous fluid.

15. The method of claim 12, wherein the clay control additive is present in the range of about 0.1 to about 1.0 percent by weight of aqueous fluid.

16. The method of claim 12, wherein said clay control additive is present in said cementing composition in an effective amount whereby permeability damage resulting from contact of the clays in the formation with the aqueous portion of the cementing composition is reduced.

17. The method of claim 12, wherein the clay control additive comprises at least one of (2-chloroethyl)trimethylammonium chloride, (2-bromoethyl)trimethylammonium chloride, (2-hydroxyethyl)trimethylammonium chloride, tetramethylammonium chloride or trimethylethyl ammonium chloride.

* * * * *